Jan. 7, 1964  YOSHIHIRO MISHINA ETAL  3,116,871
ROTARY GAS MOTOR AND COMPRESSOR WITH CONICAL ROTORS
Filed Oct. 19, 1961  3 Sheets-Sheet 3

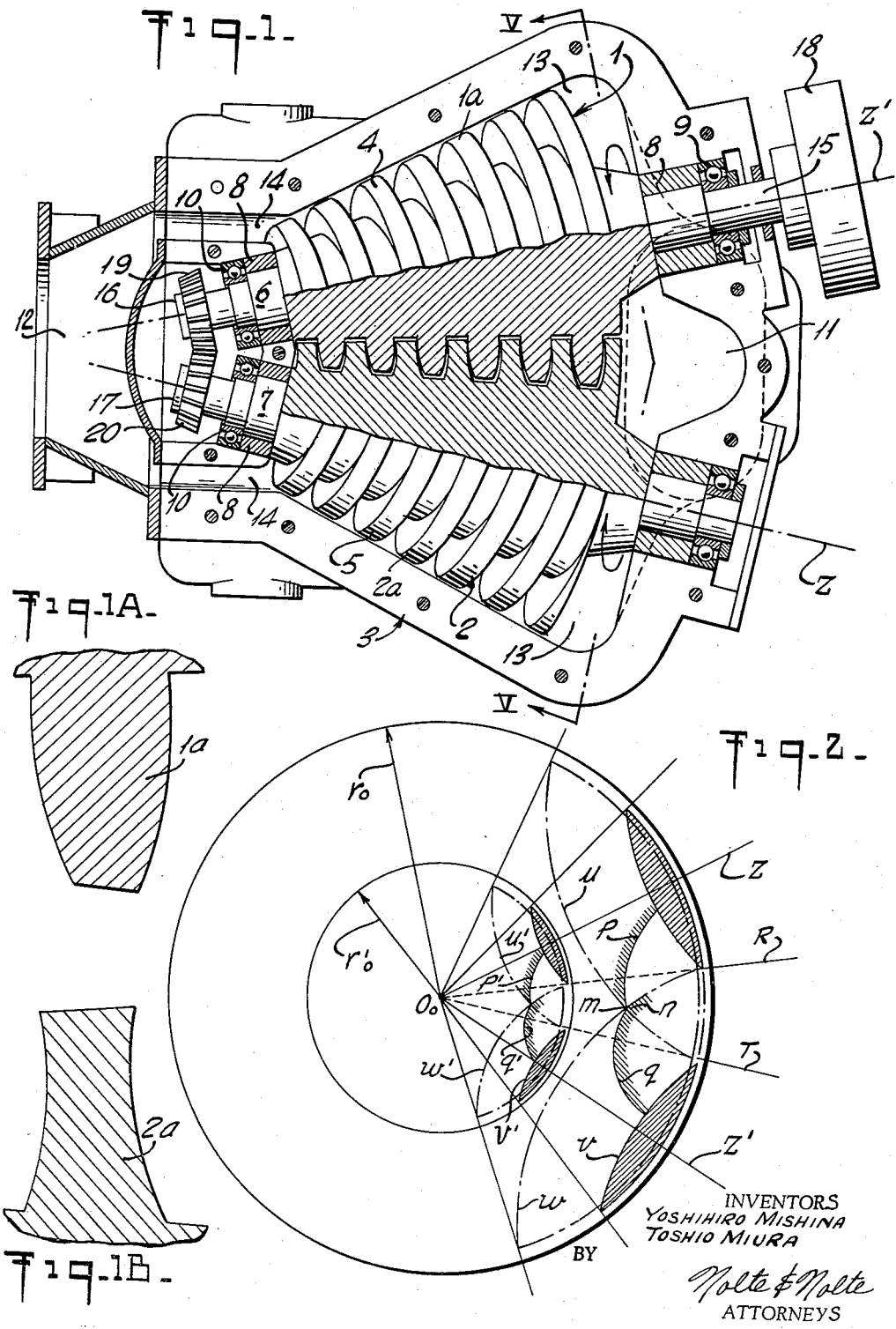

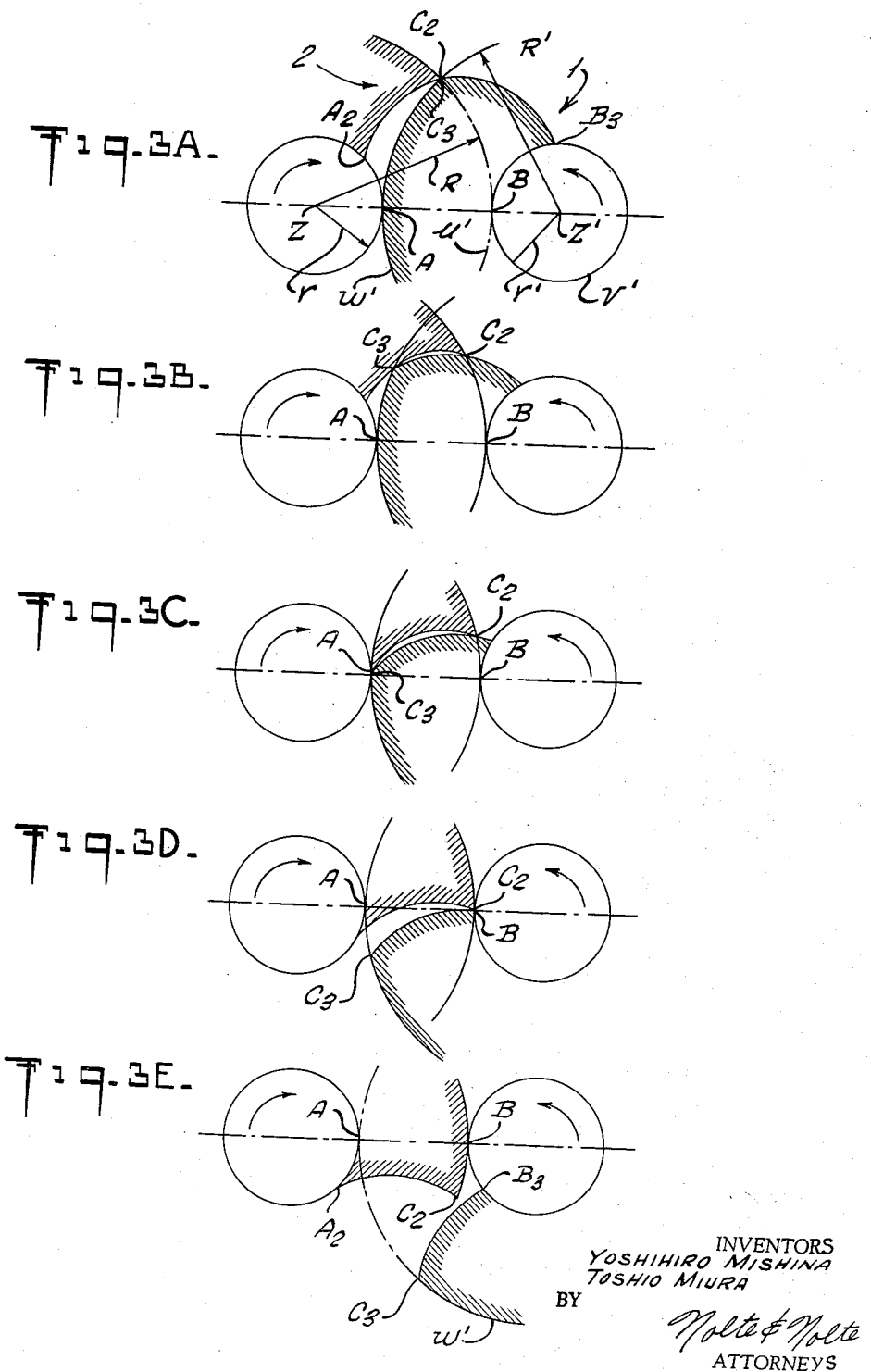

INVENTORS
YOSHIHIRO MISHINA
TOSHIO MIURA
BY
Nolte & Nolte
ATTORNEYS

United States Patent Office

3,116,871
Patented Jan. 7, 1964

3,116,871
ROTARY GAS MOTOR AND COMPRESSOR WITH CONICAL ROTORS
Yoshihiro Mishina, Matsudo-shi, and Toshio Miura, Tokyo-to, Japan, assignors to Ishikawajima-Harima Jukogyo Kabushiki Kaisha, Tokyo, Japan, a company of Japan
Filed Oct. 19, 1961, Ser. No. 146,142
Claims priority, application Japan Dec. 15, 1960
6 Claims. (Cl. 230—142)

This invention relates to rotary engines or motors with conical rotors and has particular reference to rotary devices, in the rotors of which a gaseous fluid sucked from one end of the rotors is compressed or expanded and is continuously discharged from the other end in accordance with the fact that the volume formed between the intermeshing conical rotors varies gradually as they revolve.

The conical rotors in the present invention are, in general, used for air and gas compressors and for rotary engines or motors such as gas turbines.

The devices of the present invention remove many defects of conventional rotary devices: difficulty of manufacture of rotors, and their complicated adjustment, as well as many other drawbacks.

Furthermore, this device can reduce the throttling loss and noise caused by the fact that the suction and delivery areas are limited.

Especially, even if the rotors shift in the axial direction on account of the pressure rise at the high pressure side, i.e. the small diameter end, or on account of the attrition of the thrust bearings mounted at the small ends of the rotors, the minute tip clearances between the inner surfaces of the casing and the outer surfaces of the rotors are maintained, so as to avoid metallic contact therebetween. Thus, safe and abrasion-free running can be performed only by this invention and cannot be guaranteeed with conventional rotary engines or motors, e.g., screw compressors having lateral shafts.

The invention will now be fully explained with reference to the exemplary embodiment shown in the drawings, wherein FIG. 1 is a schematic cross-sectional view of a rotary engine or motor according to this invention, with portions of the rotors broken away;

FIGS. 1A and 1B show respective sections, on an enlarged scale, of the convex male and concave female tooth flanks;

FIG. 2 is a schematic view showing the intermeshing of the rotors in the rotary engine;

FIGS. 3A-3E are schematic views illustrating consecutive intermeshing positions of the spherical rotor surfaces;

Figure 4:
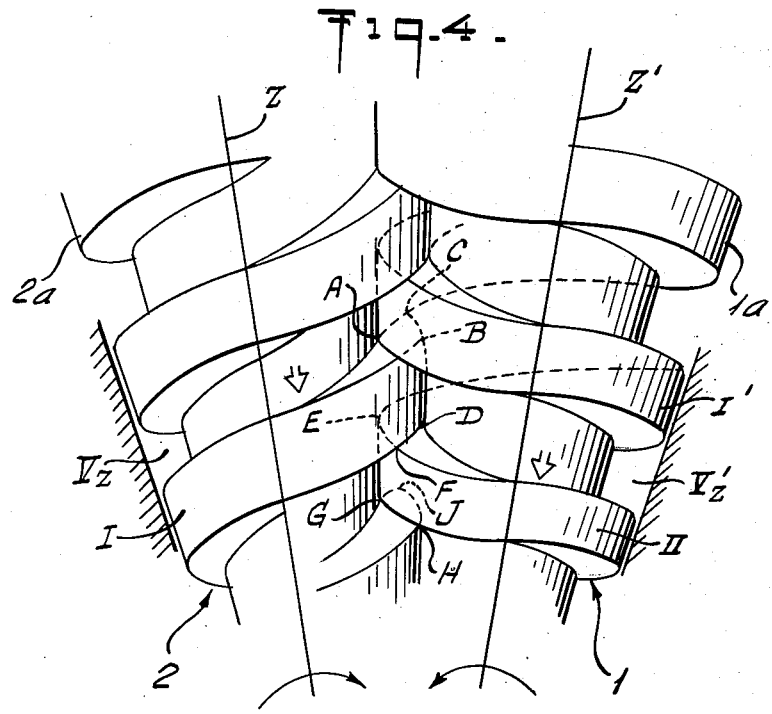
FIG. 4 shows schematically the composition of the continuous sealing line produced by the intermeshing rotors.

As is shown in FIG. 1, a casing 3 has therein conical rotors 1, 2 having a predetermined number of screw gears 4, 5 on the outer surface of the cone cut at its head. The tooth profiles of the intermeshing gears are made so as to form a continuous line of contact. The rotors 1, 2 are installed in casings 8 which are supported by bearings 9, 10. Shafts 6, 7 in the rotors 1, 2 pass through the closed parts 8 which represent sealing devices, so that the extended lines of the respective rotor axes Z′, Z cross each other. Rotor 1 has convex male tooth flanks 1a illustrated in FIG. 1A while rotor 2 has concave female tooth flanks 2a shown in FIG. 1B.

For operation as a compressor, an inlet port 11 is provided at one end of the casing 3 and a discharge port 12 at the other end.

Gaseous fluid is compressed and transported to a discharge chamber or space 14 connected with the discharge port 12 from an inlet chamber or space 13 connected with the inlet port 11 by the intermeshing rotation of the rotors 1 and 2.

The compressor is driven by a motor the movement of which is transmitted to a shaft 15 of rotor 1 through a coupling 18.

Timing gears 19 and 20 are arranged at the ends of rotor shafts 16 and 17 in such a manner that the rotors 1 and 2 do not touch one another at any point.

That is to say, the cooperating rotors operate with a tip clearance relative to each other and to the casing 3 so that leakage of gaseous fluid is kept at a minimum.

Therefore, when the rotors are intermeshed, as a feature of a conical worm gear, the volume or space formed between the intermeshing helically grooved rotors and the casing decreases gradually, from the large end toward the small end. The volume of the grooves is divided among the rotor threads, so that the gaseous fluid which reaches the screw threads 4 and 5 at the suction side (the wider end) through the inlet space 13 from the inlet port 11 decreases in volume and raises the pressure instantaneously with the rotation of the intermeshed rotors and flows into the discharge space 14. So compressed fluid can be obtained continuously from the discharge port.

Accordingly, as the inventive rotary engine, being different from such simple air and gas-transporting machines as Roots blowers (simple air and gas-transporting machines which only transport gaseous fluid from the inlet port to the discharge space and raise the pressure fast by the instantaneous counter-flow of the compressed fluid at the outlet port), can compress gaseous fluid between the rotors, it is operated very efficiently. The timing gear is preferably set at one end of the shaft as the gaseous fluid is treated in a so-called "oil free" condition in which lubricating oil does not get in, and the intermeshed parts of the rotors accurately maintain the tip clearance between each other, so that direct metallic contact of the rotors is prevented. The continuity of this minute tip clearance is hereafter to be called a continuous sealing line.

It should be noted that although the rotor teeth are so shaped that one rotor can drive the other if brought in direct contact, it is preferred to interconnect the rotors by the timing gears 19, 20.

Next, the structure of the screw threads and the tooth profiles is to be explained. The intermeshing of each cross-section, shown in FIG. 2 when cut by the spherical surface with any given radius from the intersecting point of the two rotor axes as the center, as is known in the case of bevel gears, is to be analyzed on the surface of a sphere having intersecting point $O_0$ of the extended axes Z, Z′ as the center and any given radius being $r_0$.

Hereafter, the tooth profile which is necessary to get the above-mentioned continuous intermeshing line is to be explained.

The two worms have rolling circles the number of which is proportionate to the number of screw threads (for example, in case the number of teeth of the worm of the Z-axis is three, and that of the Z′-axis worm two, the proportion of the surface of the rolling circles with Z and Z′ axes is 3:2); in FIGURE 2, with Z-axis worm the circle $u$, and with Z′-axis worm the circle $v$ is the rolling circle, respectively. And in any section—the spherical surface with the radius $r'_0$—it is so constructed that the circle $u'$ and the circle $v'$ can be the rolling circles without changing the ratio of the sizes of the rolling circles. In this case, the outside diameter of the Z′-axis conical worm is the circle $w$ on the spherical surface with the radius $r_0$, and it has to taper down to the circle $w'$, decreasing in proportion with the radius of the sphere on the spherical surface with the radius $r'_0$.

In order to get a complete continuous sealing line, it is necessary for a set of tooth profiles to be given as an envelope tooth profile, namely, one tooth profile being a concave curve and only existing inside the rolling circle, and the other being a convex curve and only existing outside the rolling circle.

In this invention, the tooth profile $p$ of the Z-axis conical worm is the curve generated by the point $m$ on the circle W described by the tooth or tip point of the Z'-axis conical worm, namely a spherical trochoid, and the tooth profile $q$ of the Z'-axis worm is made to be a spherical cycloid generated by the point $n$ on the circle $u$ described by the tooth profile tip point of the Z-axis conical worm. And, as to any other parts, namely the spherical surface with the radius $r'_0$, what was mentioned above is also necessary for each tooth profile $p'$ and $q'$. Though the intermeshing of the tooth profiles of the plane trochoid and the plane cycloid is already widely known, as the tooth profiles of parallel shafts of screw compressors, the screw composed of a spherical cycloid and a spherical trochoid, which is described in this invention, could not be sought from any development of the idea of parallel shafts; the tooth profile of the screw threads described in this invention is a special one invented for rotary engines, motors or compressors, to be put into practice and given more effect.

It is evident from the explanation given above that, when the conical worm of this invention is cut by numerous spherical surfaces having the intersecting point of the two axes as their center, the tooth profiles on each surface are composed of spherical cycloids and trochoids mentioned above. In each sectional tooth profile the phase or the position of the intermeshing has to change continuously; this is also evident from the fact that the conical worms of this invention have screw threads twisted towards the axes.

In order to make this relation clearer, FIGS. 3A through 3E are given with a view to explain the intermeshing at any cross-section of the spherical surface. Here, the circles $u'$ and $v'$ are the rolling circles corresponding to the circles $u'$ and $v'$ of FIGURE 2, and the tooth profile section $C_3$—$B_3$ is expressed by the spherical cycloid curve.

The tooth profile section $C_2$—$A_2$ expresses the spherical trochoid made by the tooth point $C_3$ of the Z'-axis conical worm. The five schematic views illustrate consecutive interengaging positions of the rotor surfaces $A_2$—$C_2$ and $C_3$—$B_3$, respectively belonging to the Z- and Z'-axis rotors 2 and 1.

Now, if the two gears rotate in the directions of the arrows with the circles $u'$ and $v'$ as rolling circles, as shown in FIGS. 3A, 3B and 3C, the intermeshing i done, the tip point $C_3$ of the Z'-axis conical worm will always be in contact with the tooth section $C_2$—$A_2$, and the tooth point $C_2$ of the gear Z in contact with the tooth profile section $C_3$—$B_3$ (see FIGS. 3A–3C). If the intersecting point of the great circle, which connects the centers or poles of circles $v'$ and the circle $u'$, and the circle described by the tip point of the Z' axis is A, and the intersecting point of the bigger circle and the circle $u'$ described by the tip point of the Z axis is B, the tip point $C_3$ of the circle $v'$ moves away from the gear surface $C_2$—$A_2$ when it has passed A (see FIG. 3D), and the tip point $C_2$ of the circle $u'$ moves away from the gear surface $C_3$—$B_3$ when it has passed B (see FIG. 3E).

The contact between the point $C_2$ and the tooth profile section $C_3$—$B_3$ will cease after the point B is passed. This is the relation shown in FIGS. 3D and 3E. In these two positions, the respective tooth profile sections are shown in their positions occupied in or rather beyond the last phases of the mutual rotor engagement. The tooth profiles $A_2$—$C_2$ and $C_3$—$B_3$ contact each other only at the tooth edges, and are not in contact at any other portion of the tooth profiles.

As has been explained hereinabove, a continuous contact is achieved by the outside surfaces of the two conical worms. The path described by tip point $C_2$ in its travel through the consecutive positions of FIGS. 3A through 3E is shown in a dot-dash line in FIG. 3A; similarly, the path of tip point $C_3$ appears in a similar line applied to FIG. 3E. It can be seen that between the two dot-dash lines and the points A, B a lens-shaped area is defined (best seen in FIG. 3A).

It was said before that in case of conical worms the phase of intermeshing at each section has to vary continuously. This means that, when the curved sections (being a part of a sphere) are sought one by one along the direction of the axis, such conditions as shown in FIGS. 3A, 3B, 3C, 3D and 3E result, which vary continuously. In the section including Z and Z' axes the tooth profiles appear in equal pitch or unequal pitch, increasing and decreasing regularly.

To summarize this, it can be said that as, in any position of intermeshing, the lines of the tooth edges are in contact with each other's tooth surfaces, while the tooth profiles of both worms are composed of each other's tooth end lines.

FIGURE 4 shows the continuous contact line that appears when the conical rotors 1 and 2, having respective tooth flanks 1a and 2a, are intermeshed.

Contact lines such as curves A—C and B—C correspond to the curves A—$C_2$ and $C_3$—B shown in FIGURE 3A, and line B—D is the straight line in the direction of the axis made by the contact between the cone surface where the tooth end of the conical worm of axis Z lies and the cone surface where the tooth root of the conical worm of axis Z' lies.

The curves E—F and D—F, similar to the contact lines A—C and B—C, appearing by the intermeshing of the portion I of the screw thread of the Z-axis conical worm with the portion I' of the screw threads of the Z-axis conical worm shown in FIGURE 4, appear in a symmetrical position with the plane that includes the axes in case of the intermeshing of the screw thread II' of the conical worm of the axis Z' and the above-mentioned screw thread I.

The straight line E—G, following similar principles of composition as for the contact line B—D, is the axial line formed by the contact of the face cone of the Z'-axis conical worm and the root cone of the Z-axis conical worm.

The contact lines G—J and H—J correspond to the above-mentioned contact lines A—C and B—C.

Thus, in the intermeshing portion of the two conical worms, a contact line is formed which continues along the axial line.

Therefore, when the rotors rotate in the direction shown by the arrows appearing across the axes Z and Z' in FIGURE 4, the gaseous fluid within the space or volume of the groove of the Z-axis conical worm $V_z$ and in that of the groove of the Z'-axis conical worm $V'_z$ is transported in axial direction shown by the short negative arrow marks, and gradually raises the pressure in accordance with the decrease of the groove volume.

There is a certain relation between the number of threads of the two conical worms, as has been explained hereinabove; for example, in the case of the intermeshing of two conical worms, there must exist a relation whereby if the number of threads of one conical worm is $n$, then the number of threads of the other conical worm should be $n+1$. As a matter of example, the present invention contemplates the use of $n$ threads=2 for the male rotor 1 of the Z' axis, and $n+1=3$ threads for the female rotor 2 of the Z axis.

Figure 5:
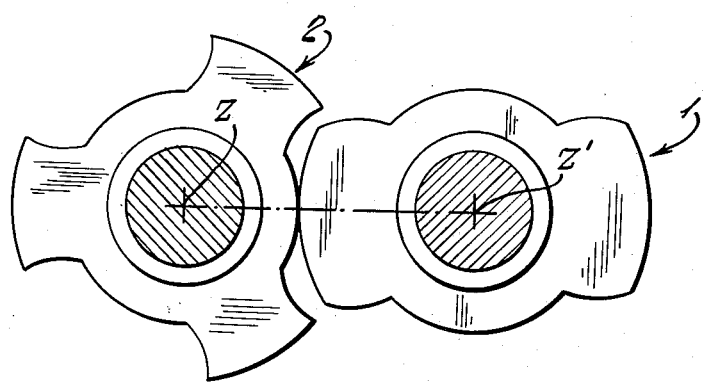
FIG. 5 is an end view of the rotors, taken along line V—V of FIG. 1.

FIG. 5 shows, in an end view looking toward the wide ends of the worms or rotors, the two threads or lobes of the male rotor 1 and the three threads or lobes of the female rotor 2, as has been described hereinabove.

When the above-mentioned continuous sealing line is formed, the neighboring grooves are not connected with each other through the intermeshing portion, and, except the very slight leakage through the small clearance between the face cone and the inner surface of the casing, there is no leakage into the neighboring grooves.

The rotary engine according to this invention has excellent effects, as follows, compared with already existing rotary air and gas-compressing and expanding machines.

As the number of convolutions of the screw thread from one end of the rotor to the other is high, for example, in case of use as a compressor, there is no possibility for the compressed fluid on the discharge side to leak into the inlet port and to raise the temperature of the inlet port, thus decreasing the volumetric efficiency. There is also almost no possibility that the volumetric efficiency be decreased, however high the temperature and the pressure of the discharging fluid become.

Also, owing to the provision of conical worms, as the nearer we come to the high-pressure side, the smaller the outside worm diameter is. Thus, the leakage between the outer surfaces of the rotors and the inner surfaces of the casing decreases as the pressure increases. The internal leakage that occurs during the process of compression or expansion is less in quantity than in the case of ordinary rotary air and gas-compressing or expanding machines of the parallel-axis type, and therefore the volume efficiency is very good.

Another big advantage is the fact that there are no side walls both at the inlet and discharge sides, and the system is open all around; therefore the flow losses in the inlet and the discharge spaces can be considerably decreased, and the machine is operated very efficiently and quietly.

As shown in FIG. 1 of the example, if the bearing 10 on the higher-pressure side serves also for the thrust force, the rotors would only extend in the axial direction towards the lower-pressure side. The tip clearance between the casing and the outer surface of the rotors can be perfectly maintained, even if the rotors are given thermal expansion by the high-temperature gas. Therefore, there would never be any danger that the rotors or the casing are injured by direct metallic contact.

The above-mentioned fact means that the tip clearance between the rotors and the casing becomes greater in case of an abrasion of the bearing surfaces by the load.

Thus, enough safety is ensured, even when a sudden change of the condition occurs on the higher pressure and higher-temperature side. The principle of operation of the rotary engine or motor of this invention is the same as that of compressing and expanding piston engines that operate with a unidirectional motion instead of reciprocation. Therefore it belongs to the "displacement type" engines or motors which are free from surging phenomena; it can be driven at a high operating speed, and so the apparatus can be manufactured light and small.

As the timing gear is set on one end of the rotors, the small clearance at the intermeshing portion of the rotors is always maintained and direct metallic contact is avoided during operation, the apparatus can be used very conveniently for the compression and transportation of combustible gas, as the gaseous fluid can be treated in dry condition.

Moreover, the cutting of the conical rotors is done easily with an ordinary lathe, without using any special gear cutting machine.

What we claim is:

1. A rotary motor for gaseous fluids adapted to be selectively operated as a compressor, comprising, in combination, a casing having axially aligned inlet and outlet flow portions provided at opposite ends of said casing, and two rotors journaled in said casing for rotation in opposite directions, said rotors having substantially coplanar and intersecting axial lines, substantially identical conical perimeters and meshing helical threads, the number of threads in one of the rotors exceeding by one the number of threads in the other rotor, said one rotor having female threads with a concave profile and a section corresponding to a spherical trochoid while said other rotor has male threads with a convex profile and a section corresponding to a spherical cycloid, said profiles appearing on both sides of the respective threads and forming part of spherical surfaces of which the centers coincide with the intersecting point of said axial lines, the bottoms of said threads forming cones, the heights of said threads decreasing from one axial end of said rotors to the other, the threads of said rotors forming respective rotor grooves therebetween which contact each other so as to provide a continuous sealing line along the entire lengths of said rotors, whereby the gaseous fluid confined in one groove is prevented from mingling with the fluid contained in neighboring grooves, and the fluid is expanded and selectively compressed between said grooves of the two rotors depending upon the mode of operation and the sense of rotation of said rotors.

2. A rotary motor according to claim 1, wherein said profiles of said one rotor are formed on the surface of a sphere by the tooth edge of said other rotor, and said profiles of said other rotor are formed on a similar surface by the tooth edge of said one rotor.

3. A rotary motor according to claim 1, wherein said casing defines inlet and outlet chambers adjacent the respective inlet and outlet portions, said intersecting point being closer to said outlet chamber than to said inlet chamber.

4. A rotary motor according to claim 1, further comprising bearing means for at least one end of each of said rotors, and gear means operatively interconnecting the adjacent ends of said rotors for synchronous but opposite rotation.

5. A rotary motor according to claim 1, wherein said inlet portion is provided at the side of said casing opposite said intersecting point, the spaces defined between said profiles of the rotors being adapted to compress said fluids as they are moving toward said outlet portion.

6. A rotary motor according to claim 1, wherein said male and said female threads have mutually engaging portions so that said rotors are in direct driving contact with one another.

References Cited in the file of this patent

UNITED STATES PATENTS

| 678,570 | Jones | July 16, 1901 |
| 1,323,459 | Dorr | Dec. 2, 1919 |
| 2,908,226 | Rich et al. | Oct. 13, 1959 |
| 2,939,745 | Carlsmith et al. | June 7, 1960 |

FOREIGN PATENTS

| 16,476 | Great Britain | of 1895 |
| 347,246 | Great Britain | Apr. 20, 1931 |
| 464,475 | Great Britain | Apr. 16, 1937 |
| 696,732 | Great Britain | Sept. 9, 1953 |
| 789,211 | France | Aug. 12, 1935 |